United States Patent
Byun

(10) Patent No.: US 11,256,615 B2
(45) Date of Patent: Feb. 22, 2022

(54) APPARATUS AND METHOD FOR MANAGING MAP SEGMENT USING MAP MISS RATIO OF MEMORY IN A MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/681,076

(22) Filed: Nov. 12, 2019

(65) Prior Publication Data
US 2020/0334138 A1 Oct. 22, 2020

(30) Foreign Application Priority Data

Apr. 17, 2019 (KR) .......................... 10-2019-0044900

(51) Int. Cl.
*G06F 12/02* (2006.01)
*G06F 3/06* (2006.01)
*G06F 12/06* (2006.01)

(52) U.S. Cl.
CPC .......... *G06F 12/0246* (2013.01); *G06F 3/064* (2013.01); *G06F 3/0619* (2013.01); *G06F 3/0659* (2013.01); *G06F 3/0679* (2013.01); *G06F 3/0688* (2013.01); *G06F 12/06* (2013.01); *G06F 2212/7201* (2013.01)

(58) Field of Classification Search
CPC .. G06F 12/0246; G06F 3/0679; G06F 3/0659; G06F 12/06; G06F 3/0688; G06F 3/0619; G06F 3/064; G06F 2212/7201; G06F 3/0616; G06F 12/063

USPC ....................................................... 711/154
See application file for complete search history.

(56) References Cited

U.S. PATENT DOCUMENTS

| | | | |
|---|---|---|---|
| 9,128,715 | B2 | 9/2015 | Stenfort |
| 9,229,854 | B1 | 1/2016 | Kuzmin et al. |
| 9,378,135 | B2 | 6/2016 | Bennett |
| 9,400,749 | B1 | 7/2016 | Kuzmin et al. |
| 9,547,360 | B2 | 1/2017 | Park et al. |

(Continued)

FOREIGN PATENT DOCUMENTS

| KR | 10-2014-0065856 A | 5/2014 |
|---|---|---|
| KR | 10-2018-0123192 A | 11/2018 |

OTHER PUBLICATIONS

Office Action issued by the USPTO for U.S. Appl. No. 16/734,075 dated Mar. 3, 2021.

(Continued)

*Primary Examiner* — Mardochee Chery
(74) *Attorney, Agent, or Firm* — IP & T Group LLP

(57) ABSTRACT

A memory system may include a memory device and a controller including a memory, suitable for generating map data for mapping between a physical address corresponding to data within the memory device in response to a command and a logical address received from a host, wherein the controller selects a memory map segment among a plurality of memory map segments, when a read count corresponding to the selected memory map segment is greater than or equal to a first threshold, calculates a map miss ratio of the memory using a total read count and a map miss count, and transmits the selected memory map segment to the host when the map miss ratio is greater than or equal to a second threshold.

25 Claims, 11 Drawing Sheets

(56) References Cited

U.S. PATENT DOCUMENTS

| | | |
|---|---|---|
| 9,927,994 B2 | 3/2018 | Byun |
| 10,157,004 B2 | 12/2018 | Michaeli |
| 10,198,198 B2 | 2/2019 | Machida |
| 10,229,051 B2 | 3/2019 | Hwang et al. |
| 10,860,228 B1 | 12/2020 | Mulani et al. |
| 2007/0283125 A1* | 12/2007 | Manczak ............ G06F 11/3466 711/207 |
| 2008/0189485 A1 | 8/2008 | Jung et al. |
| 2012/0110259 A1 | 5/2012 | Mills et al. |
| 2013/0067125 A1 | 3/2013 | Rizzo et al. |
| 2013/0268741 A1 | 10/2013 | Daly et al. |
| 2013/0290571 A1 | 10/2013 | Rizzo et al. |
| 2014/0215129 A1 | 7/2014 | Kuzmin et al. |
| 2015/0331624 A1 | 11/2015 | Law |
| 2016/0070474 A1 | 3/2016 | Yu et al. |
| 2017/0038973 A1 | 2/2017 | Takano |
| 2017/0109089 A1 | 4/2017 | Huang |
| 2017/0357572 A1 | 12/2017 | Okubo et al. |
| 2018/0039578 A1* | 2/2018 | Yun ....................... G06F 3/0656 |
| 2018/0081569 A1 | 3/2018 | Kan et al. |
| 2018/0121109 A1 | 5/2018 | Li |
| 2018/0121121 A1 | 5/2018 | Mehra et al. |
| 2018/0239726 A1 | 8/2018 | Wang et al. |
| 2019/0004944 A1 | 1/2019 | Widder et al. |
| 2019/0079859 A1 | 3/2019 | Li et al. |
| 2019/0087125 A1 | 3/2019 | Matsumoto et al. |
| 2019/0108131 A1 | 4/2019 | Lee et al. |
| 2019/0129838 A1 | 5/2019 | Yoshida et al. |
| 2019/0266079 A1 | 8/2019 | R et al. |
| 2019/0384506 A1 | 12/2019 | Shivanand et al. |
| 2020/0065259 A1 | 2/2020 | Byun |
| 2020/0225875 A1 | 7/2020 | Oh |
| 2021/0056021 A1 | 2/2021 | Parry et al. |

OTHER PUBLICATIONS

Office Action issued by the USPTO for U.S. Appl. No. 16/850,929 dated Aug. 25, 2021.

Office Action issued by the USPTO for U.S. Appl. No. 16/673,730 dated Jun. 28, 2021.

Office Action issued by the USPTO for U.S. Appl. No. 16/841,431 dated Jul. 28, 2021.

Notice of Allowance issued by the USPTO for U.S. Appl. No. 16/673,730 dated Oct. 18, 2021.

* cited by examiner

FIG. 6

MAP MANAGEMENT DATA — 1442

| | MM TABLE | | |
|---|---|---|---|
| | M_SEGMENT LIST | RD_CNT | CND_FLAG |
| 1 | M_SEGMENT 11 | 30 | 0 |
| 2 | M_SEGMENT 03 | 2000 | 1 |
| 3 | M_SEGMENT 06 | 400 | 0 |
| 4 | M_SEGMENT 30 | 1000 | 1 |
| 5 | M_SEGMENT 15 | 900 | 1 |
| ⋮ | ⋮ | ⋮ | ⋮ |

| MISS TABLE | | |
|---|---|---|
| ALL_RD_CNT | MISS_CNT | MISS_RATIO |
| 10,000 | 3000 | 30% |

| TH TABLE | |
|---|---|
| RD_CNT TH(TH1) | MISS_CNT TH(TH2) |
| 500 | 25% |

APPARATUS AND METHOD FOR MANAGING MAP SEGMENT USING MAP MISS RATIO OF MEMORY IN A MEMORY SYSTEM

CROSS-REFERENCE TO RELATED APPLICATION

This application claims priority under 35 U.S.C. § 119 to Korean Patent Application No. 10-2019-0044900 filed on Apr. 17, 2019, which is incorporated herein by reference in its entirety.

BACKGROUND

1. Field

Various embodiments of the present invention relate to a memory system and, more particularly, to an apparatus and method for transmitting map data to a host or computing device in a memory system included in a data processing system.

2. Discussion of the Related Art

Recently, the paradigm for the computer environment has shifted to ubiquitous computing, which allows computer systems to be used anytime and anywhere. As a result, the use of portable electronic devices such as mobile phones, digital cameras, and laptop computers has rapidly increased. In general, such portable electronic devices use a memory system including a memory device for managing the storage and the reading of data. Hence, a memory system is a data storage device based on semiconductor technology. Memory systems have been used both as main or auxiliary memory of portable electronic devices.

SUMMARY

Various embodiments are directed to a memory system using a host memory and an operating method thereof.

Also, various embodiments are directed to a data processing system capable of minimizing complexity and performance degradation, and maximizing the usage efficiency of a memory device to rapidly and stably process data to the memory device, and an operating method thereof.

Further, various embodiments are directed to a data processing system which includes a host and a memory system, capable of monitoring map segments to be uploaded to the host or a computing device, by using a map miss ratio, and reflecting the monitoring result at the time that map data is transmitted to the host, thereby efficiently managing the entire performance of the memory system.

Technical objects of the present disclosure are not limited to the above-described technical objects, and other technical objects which are not described herein will be clearly understood by those skilled in the art to which the present disclosure pertains, based on the following descriptions.

In an embodiment, a memory system may include: A memory system may include a memory device and a controller including a memory, suitable for generating map data for mapping between a physical address corresponding to data within the memory device in response to a command and a logical address received from a host, wherein the controller selects a memory map segment among a plurality of memory map segments, when a read count corresponding to the selected memory map segment is greater than or equal to a first threshold, calculates a map miss ratio of the memory using a total read count and a map miss count, and transmits the selected memory map segment to the host when the map miss ratio is greater than or equal to a second threshold.

In an embodiment, there is provided an operating method of a memory system which includes a memory device and a controller including a memory, the operating method comprising: changing a read count of a map segment corresponding to a logical address, among a plurality of memory map segments; selecting some of the plurality of memory map segments, when read counts corresponding to the selected memory map segments are greater than or equal to a first threshold; deciding whether to upload the selected memory map segments to the host, when a map miss ratio of the memory is greater than or equal to a second threshold; and transferring the selected memory map segments to the host in response to the decision result.

In an embodiment, a memory system may include: a memory device; and a controller including a map cache for storing a plurality of map segments associated with the memory device, suitable for: receiving read commands from a host; determining map miss counts of the map cache for the plurality of map segments corresponding to the read commands; selecting at least one map segment among the plurality of map segments, when a map miss count corresponding to the selected map segment is greater than or equal to a threshold value; and transmitting the selected map segment to the host.

It is noted that the following detailed described embodiments are only examples of the present invention, and that various other embodiments or variations may be derived and understood by those with ordinary skill in the art based on the detailed described embodiments.

BRIEF DESCRIPTION OF THE DRAWINGS

FIGS. 5 and 6 are diagrams illustrating an operation of a data processing system in accordance with an embodiment.

DETAILED DESCRIPTION

Figure 1:
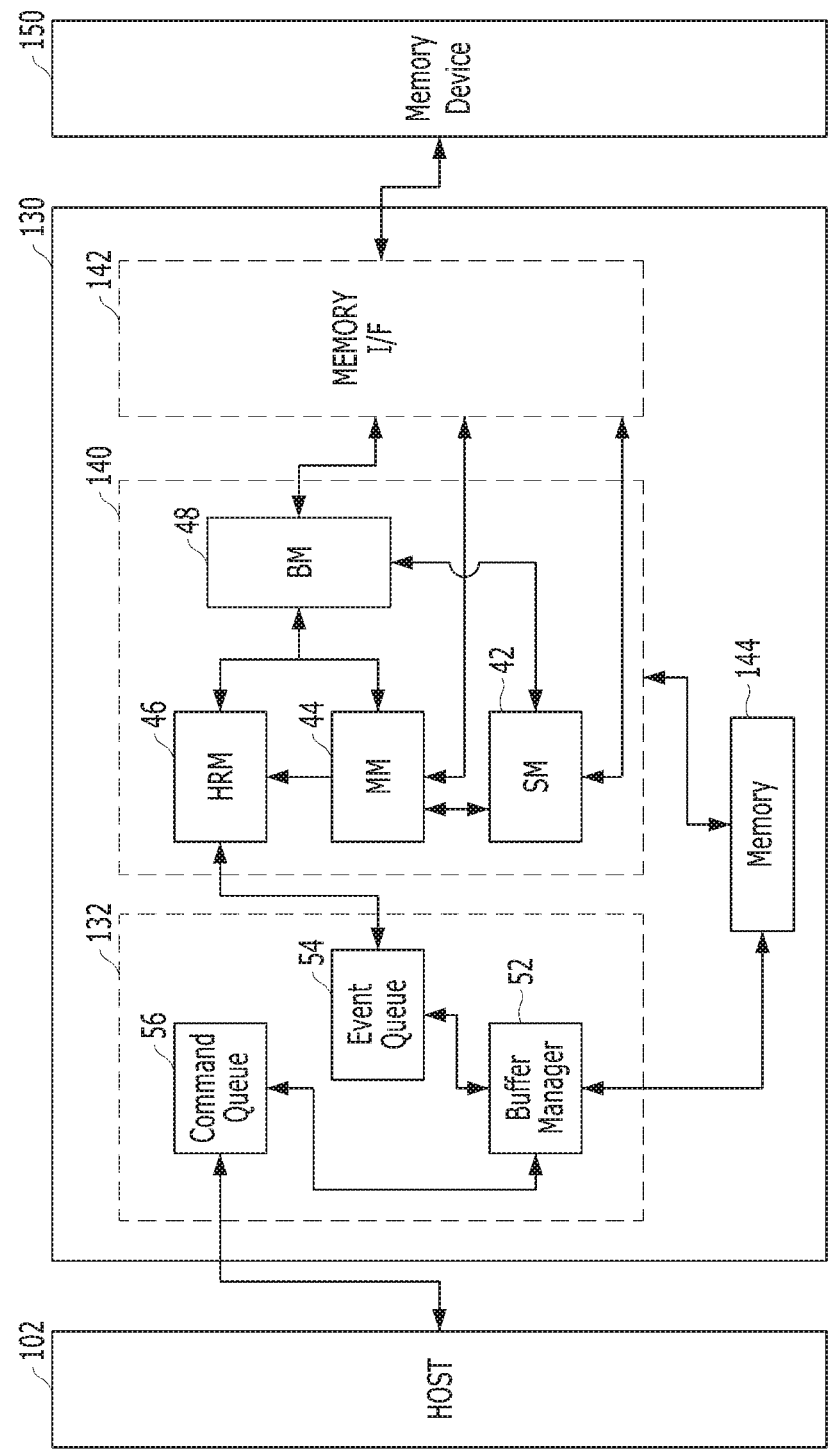
FIG. 1 illustrates a data processing system in accordance with an embodiment of the disclosure.

FIG. 1 shows a data processing system in accordance with an embodiment of the disclosure.

Referring to FIG. 1, the data processing system may include a host 102 and a memory system which includes a controller 130 and a memory device 150. The controller 130 cooperates with the host 102 and the memory device 150. The controller 130 includes a host interface (I/F) 132, a memory interface (I/F) 142, a memory 144 and a flash translation layer (FTL) 140.

The host interface 132 may handle commands and data, which are received from the host 102. By way of example but not limitation, the host interface 132 may include a buffer manager 52, an event queue 54 and a command queue 56. The command queue 56 may sequentially store the commands and the data, and output them to the buffer manager 52 in a stored order. The buffer manager 52 may classify, manage or adjust the commands and the data, which are delivered from the command queue 56. The event queue 54 may sequentially transmit events for processing the commands and the data which are received from the buffer manager 52.

A plurality of commands and/or data of the same characteristic may be continuously received from the host 102. Alternatively, a plurality of commands and/or data of different characteristics may be received from the host 102, after being mixed or jumbled. For example, the host 102 may transmit a plurality of commands for reading data (i.e., read commands). For another example, the host 102 may alternatively transmit commands for reading data (i.e., read command) and programming/writing data (i.e., write command). The host interface 132 may store commands and data, which are received from the host 102, to the command queue 56 sequentially. Thereafter, the host interface 132 may estimate or predict what type of operation the controller 130 will perform according to the characteristics of the command, data, and other relevant information which is received from the host 102. The host interface 132 may determine a processing order and a priority of commands and data, based at least on their characteristics. According to characteristics of commands and data, the buffer manager 52 is configured to determine whether the buffer manager 52 should store commands and data in the memory 144, or whether the buffer manager 52 should deliver the commands and the data to the FTL 140. The event queue 54 receives events, entered from the buffer manager 52, which are to be internally executed and processed by the memory system 110 or the controller 130 in response to the commands and the data, so as to deliver the events to the FTL 140 in the order received.

In accordance with an embodiment, the FTL 140 may include a state manager (SM) 42, a map manager (MM) 44, a host request manager (HRM) 46, and a block manager (BM) 48. The host request manager 46 may manage the events entered from the event queue 54. The map manager 44 may handle or control map data. The state manager 42 may perform garbage collection (GC) or wear leveling (WL). The block manager 48 may execute commands or instructions on a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map manager 44, to determine a physical address corresponding to the logical address which is entered with the events. The host request manager 46 may send a read request with the physical address to the memory interface 142, to process the read request (or handle the events). On the other hand, the host request manager 46 may send a program request (or write request) to the block manager 48, to program entered data to a specific page of the unrecorded (no data) in the memory device 150. Then, the host request manager 46 may transmit a map update request corresponding to the program request to the map manager 44, to update an item relevant to the programmed data for mapping the logical-to-physical addresses to each other.

The block manager 48 may convert a program request delivered from the host request manager 46, the map manager 44, and/or the state manager 42 into a flash program request used for the memory device 150, to manage flash blocks in the memory device 150. In order to maximize or enhance program or write performance of the memory system 110, the block manager 48 may collect program requests and send flash program requests for multiple-plane and one-shot program operations to the memory interface 142. It can be plausible that the block manager 48 sends several flash program requests to the memory interface 142 to enhance or maximize parallel processing of the multi-channel and multi-directional flash controller (i.e., the memory interface 142).

The block manager 48 may be configured to manage blocks in the memory device 150 according to the number of valid pages. Further, the block manager 48 may select and erase blocks having no valid pages when a free block is needed, and select a block including the least number of valid pages when it is determined that garbage collection is necessary. The state manager 42 may perform garbage collection to move the valid data to an empty block and erase the blocks containing the moved valid data so that the block manager 48 may have enough free blocks (i.e., empty blocks with no data). If the block manager 48 provides information regarding a block to be erased to the state manager 42, the state manager 42 checks all flash pages in the block to be erased to determine whether each page is valid. For example, to determine validity of each page, the state manager 42 may identify a logical address stored in an area (e.g., an out-of-band (OOB) area) of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made, and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) is not completed normally, the map manager 44 may not perform the mapping table update. This is because the map request is issued with old physical information if the state manger 42 requests a map update and a valid page copy is completed later. The map manager 44 may perform a map update operation to ensure accuracy only if the latest map table still points to the old physical address.

The memory device 150 may include a plurality of memory blocks. The plurality of memory blocks may be classified into different types of memory blocks such as a single level cell (SLC) memory block or a multi-level cell (MLC) memory block, according to the number of bits that can be stored or represented in one memory cell of the block. The SLC memory block includes a plurality of pages implemented by memory cells, each storing one bit of data. The SLC memory block may have high data input and output (I/O) operation performance and high durability. The MLC memory block includes a plurality of pages implemented by memory cells, each storing multi-bit data (e.g., two bits or more). The MLC memory block may have larger storage capacity in the same space than the SLC memory block. The MLC memory block may be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment, the memory device 150 is embodied as a nonvolatile memory for example, a flash memory such as a NAND flash memory or a NOR flash memory. In another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM).

Figure 2:
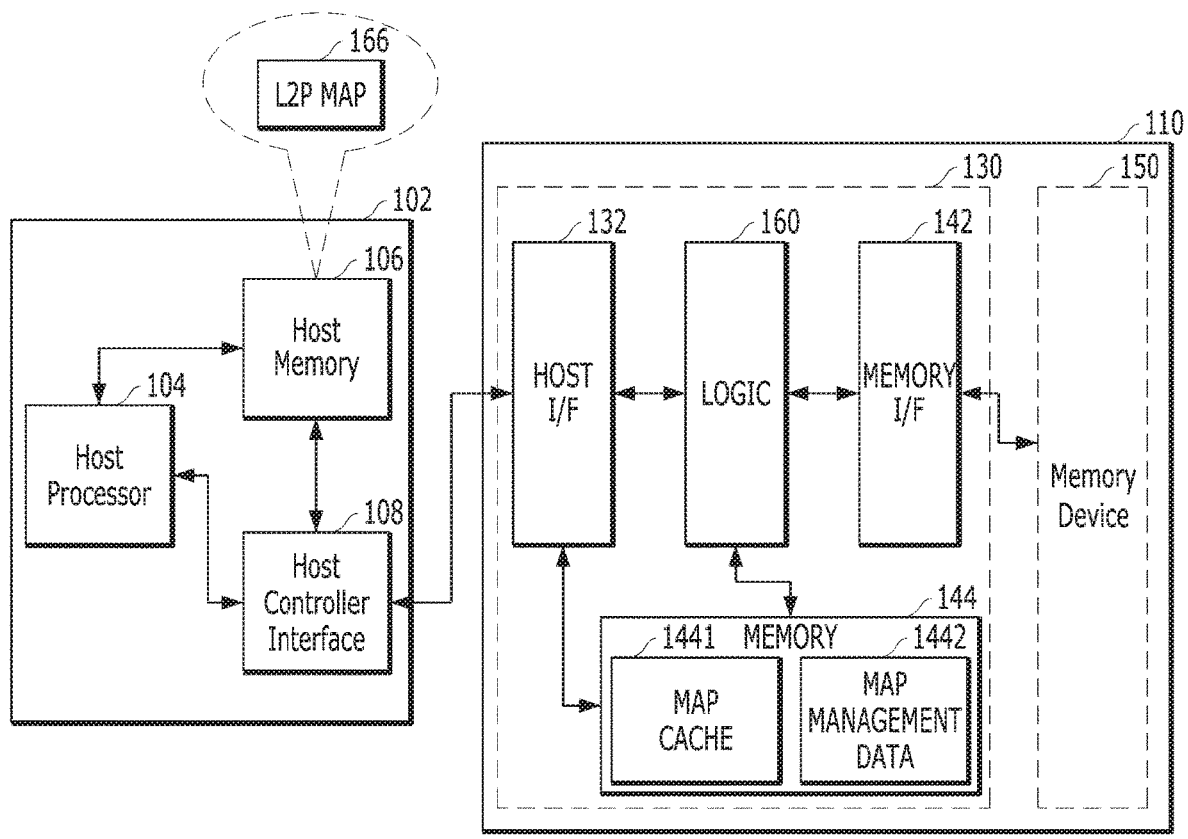
FIG. 2 illustrates a host including a host memory as a cache device for storing meta data and a memory system.

FIG. 2 illustrates a host including a host memory used as a cache device for storing meta data, and a memory system.

Referring to FIG. 2, the host 102 may include a host processor 104, a host memory 106 and a host controller interface 108. The memory system 110 may include a controller 130 and a memory device 150. The controller 130 and the memory device 150 which are described with reference to FIG. 3 may be similar to the controller 130 and the memory device 150 which are described with reference to FIGS. 1 and 2.

Hereafter, the following descriptions will be focused on contents which can technically distinguish the controller 130 and the memory device 150 which are described with reference to FIG. 2, and the controller 130 and the memory device 150 which have been described with reference to FIG. 1. In particular, a logic block 160 within the controller 130 may correspond to a flash translation layer (FTL) 140 described with reference to FIG. 1. In an embodiment, however, the logic block 160 within the controller 130 may further perform a role and function which are not included in the FTL 140.

The host 102 may include the host processor 104 having higher performance and the host memory 106 having a higher capacity, than the memory system 110 interconnected to the host 102. The host processor 104 and the host memory 106 are less spatially limited unlike the memory system 110, and can be upgraded in hardware, if necessary. Therefore, the memory system 110 may utilize resources of the host 102 to increase operation efficiency.

As the amount of data which can be stored in the memory system 110 is increased, the amount of meta data corresponding to the data stored in the memory system 110 is also increased. Since the space of the memory 144 in which the controller 130 can load meta data is limited, the increase in the amount of meta data imposes a burden on the operation of the controller 130. For example, since the internal space of the memory 144 in which the meta data can be allocated is limited, the controller 130 may load a part of the meta data, but not all of the meta data. If a position to be accessed by the host 102 is not included in the loaded part of the meta data, the controller 130 needs to re-store the loaded part of the meta data in the memory device 150 when the loaded part of the meta data has been updated. Furthermore, the controller 130 reads meta data from the memory device 150. The meta data may correspond to the position to be accessed by the host 102. Such operations are necessarily performed in order for the controller 130 to perform a read or write operation requested by the host 102, but degrade the operation performance of the memory system 110.

In an embodiment, the storage space of the host memory 106 may be several tens to several thousands of times greater than that of the memory 144 which can be used by the controller 130. Therefore, the memory system 110 may transfer meta data 166 (e.g., logical-to-physical (L2P) map data) used by the controller 130 to the host memory 106, such that the host memory 106 can be used as a cache memory for an address translation process performed by the memory system 110. In this case, the host 102 may not transfer a logical address with a command to the memory system 110, but translates a logical address into a physical address based on the meta data 166 stored in the host memory 106. Further, the host 102 may transfer the physical address with the command to the memory system 110. The memory system 110 may omit the process of translating a logical address into a physical address, and access the memory device 150 based on the transferred physical address. In this case, since the above-described operation burden which occurs while the controller 130 uses the memory 144 may be removed, the operation efficiency of the memory system 110 may be significantly improved.

Although the memory system 110 transfers the meta data 166 to the host 102, the memory system 110 may manage the source of the meta data 166. In other words, the memory system 110 may update, erase and generate the meta data 166. The controller 130 may perform a background operation such as garbage collection or wear levelling according to an operation state of the memory device 150, and decide a physical position (i.e., physical address) at which data transferred from the host 102 is to be stored in the memory device 150. Thus, the physical address corresponding to the data within the memory device 150 may be changed. Therefore, the source of the meta data 166 may be managed by the memory system 110.

That is, when the memory system 110 determines that the meta data 166 transferred to the host 102 needs to be corrected and updated during the process of managing the meta data 166, the memory system 110 may request the host 102 to update the meta data 166. The host 102 may update the meta data 166 stored in the host memory 106 in response to a request of the memory system 110. Through the update operation, the meta data 166 stored in the host memory 106 may be maintained at the latest status. Although the host controller interface 108 translates an address to be transferred to the memory system 110 using the meta data 166 stored in the host memory 106, no problems occur in the operation.

The meta data 166 stored in the host memory 106 may include first mapping information for checking a physical address corresponding to a logical address. In some embodiments, the meta data 166 for associating the logical address with the physical address may include the first mapping information for checking the physical address corresponding to the logical address and second mapping information for checking the logical address corresponding to the physical address. The meta data 166 may include the first mapping information between the two pieces of information. The second mapping information may be mainly used for an internal operation of the memory system 110, and may not be used for an operation in which the host 102 stores data in the memory system 110 or reads data corresponding to a specific logical address from the memory system 110. In an embodiment, the memory system 110 may not transfer the second mapping information to the host 102.

The controller 130 may store the first or second mapping information in the memory device 150 while managing (i.e., generating, deleting or updating) the first or second mapping information. Since the host memory 106 is a volatile memory device, the meta data 166 stored in the host memory 106 may disappear when a specific event occurs, for example, when power supplied to the host 102 and the memory system 110 is removed. Therefore, the controller 130 may not only retain the meta data 166 stored in the host memory 106 at the latest status, but also store the latest first or second mapping information in the memory device 150.

Figure 3:
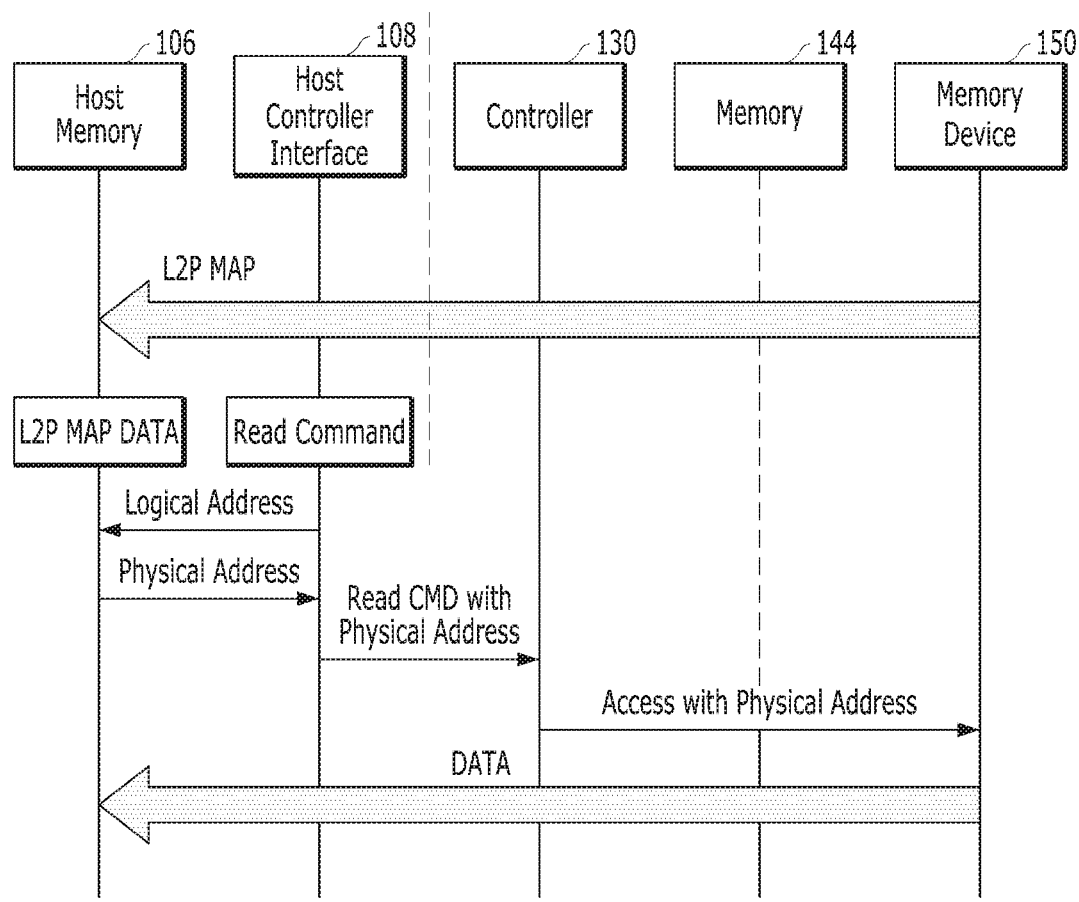
FIG. 3 illustrate a process between a host and a memory system.

Referring to FIGS. 2 and 3, the operation in which the host 102 reads data within the memory system 110 when the meta data 166 are stored in the host memory 106 will be described.

As power is supplied to the host 102 and the memory system 110, the host 102 and the memory system 110 may be interconnected to each other. When the host 102 and the memory system 110 are interconnected to each other, meta data (e.g., L2P map data) stored in the memory device 150 may be transmitted to the host memory 106.

When a read command is generated by the host processor 104, the read command is transferred to the host controller interface 108. After receiving the read command, the host controller interface 108 transfers a logical address corresponding to the read command to the host memory 106. Based on the meta data L2P MAP stored in the host memory 106, the host controller interface 108 may recognize a physical address corresponding to the logical address.

The host controller interface 108 transfers the read command Read CMD with the physical address to the controller 130. The controller 130 may access the memory device 150 based on the received read command and physical address. Data stored at a position corresponding to the physical address within the memory device 150 may be transferred to the host memory 106.

The process of reading data from the memory device 150 including a nonvolatile memory may require a larger amount of time than the process of reading data from the host memory 106 which is another nonvolatile memory. During the above-described read process, a process in which the controller 130 receives a logical address from the host 102 and finds a physical address corresponding to the logical address may be omitted. In particular, an operation in which the controller 130 accesses the memory device 150 to read meta data during the process of finding a physical address may be omitted. Through this operation, the host 102 may read data stored in the memory system 110 faster.

Figure 4:
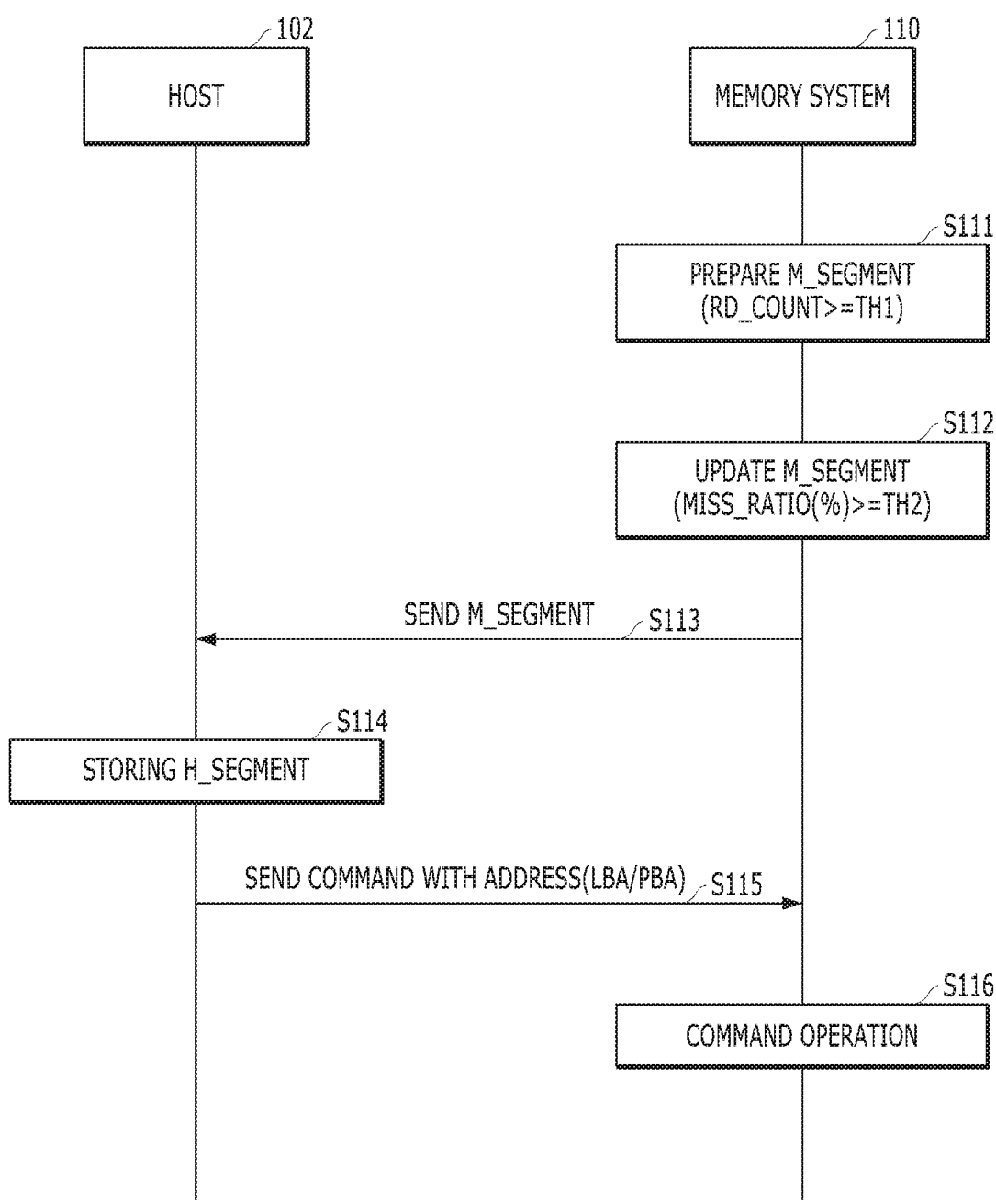
FIG. 4 is a diagram illustrating a method for sharing map data in accordance with an embodiment.

FIG. 4 is a diagram illustrating a method for sharing map data in accordance with an embodiment.

Before the method of FIG. 4 is described, the host 102 and the memory system 110 may be interconnected to each other. The host 102 may be considered as a computing device, and implemented as a mobile device, a computer, or a server. The memory system 110 may receive a command from the host 102, and store or output data in response to the received command.

The memory system 110 may have a storage space including nonvolatile memory cells. For example, the memory system 110 may be implemented in the form of a flash memory, or a solid state drive (SSD).

In order to store data requested by the host 102 in the storage space including the nonvolatile memory cells, the memory system 110 may perform mapping between a file system used by the host 102 and the storage space including the nonvolatile memory cells. For example, an address of data based on the file system used by the host 102 may be referred to as a logical address or logical block address, and an address of data in the storage space including the nonvolatile memory cells may be referred to as a physical address or physical block address. When the host 102 transfers a logical address with a read command to the memory system 110, the memory system 110 may retrieve a physical address corresponding to the logical address and then output data stored at the retrieved physical address to the host 102. During such a process, the memory system 110 may perform a mapping operation to retrieve the physical address corresponding to the logical address transferred by the host 102.

If the mapping operation performed by the memory system 110 can be performed by the host 102, the time required for the memory system 110 to output the data corresponding to the read command transferred by the host 102 may be reduced. For this operation, the memory system 110 may transfer one or more map segments, which can be positioned in a map cache 1441, to the host 102, and the host 102 may store the transferred map segment in the host memory 106. When transferring the read command to the memory system 110, the host 102 may retrieve map data from the map segment stored in the host memory 106. Then, when map data related to the read command is present, the host 102 may transfer the read command and the logical and physical addresses to the memory system 110.

When the memory system 110 transfers a map segment to the host 102 whenever map data regarding the map segment is changed, it may cost a lot of money and take a lot of time. In order to address these concerns, the memory system 110 manages the map segment and transfers the map segment to the host 102, using a read request count and a map miss count. Therefore, the memory system 110 may selectively transmit a map segment, including a logical address which is frequently referred to, to the host 102. In this regard, the present embodiment will be briefly described with reference to FIG. 4. FIG. 4 illustrates a process in which the memory system 110 requests the host 102 to transfer map data, and the host 102 receives the map data in response to the request of the memory system 110.

Referring to FIG. 4, one or more memory map segments M_SEGMENT which are accessed by the host 102 at a high frequency may be prepared in the memory 144, to improve the read performance of the memory system 110, in step S111. That is, the memory system 110 may increase a read count RD_CNT for the memory map segment M_SEGMENT based on a logical address in a read request from the host 102. Furthermore, the memory system 110 may increase a total read count ALL_RD_CNT whenever a read request is transferred from the host 102. The memory system 110 may prepare a memory map segment M_SEGMENT whose read count RD_CNT is greater than or equal to a first threshold TH1.

In steps S112 and S113, when a map miss ratio MISS_RATIO is greater than or equal to a second threshold TH2, the memory system 110 may send the sorted memory map segment M_SEGMENT to the host 102. The map miss ratio MISS_RATIO may indicate a percentage calculated based on the total read count ALL_RD_CNT and a map miss count MISS_CNT. The map miss count MISS_CNT may be counted when the memory system 110 cannot find mapping information corresponding to a logical address LBA received from the host 102 from the map cache 1441. That is, the map miss count MISS_CNT may indicate the number of times that a read request which does not include a valid physical address is received.

A reason why the memory system 110 uses the map miss ratio to provide the sorted memory map segment M_SEGMENT to the host 102 is as follows. When the sorted memory map segment M_SEGMENT is unconditionally provided to the host 102 because the access frequency by the host 102 is high, an upload process may be continuously added to cause an overhead related to the data transmitting and receiving process between the host 102 and the memory system 110. Therefore, the performance of the data processing system may be degraded.

In step S114, the host 102 may store one or more memory map segments M_SEGMENT received from the memory system 110 as a host map segment H_SEGMENT in the internal storage space thereof (for example, the host memory 106 of FIG. 2).

In step S115, the host 102 may add a physical address PBA into a command transmitted to the memory system 110 based on the map information. In the mapping operation, the host 102 can search for and find the physical address PBA in the map information stored in host map segment H_SEGMENT, based on a logical address corresponding to a command transmitted into the memory system 110. When the physical address exists and is found, the host 102 may transmit the command with the logical address and the physical address into the memory system 110.

In step S116, the memory system 110 may perform the corresponding operation using the command and the logical and physical addresses LBA and PBA.

Figure 5:
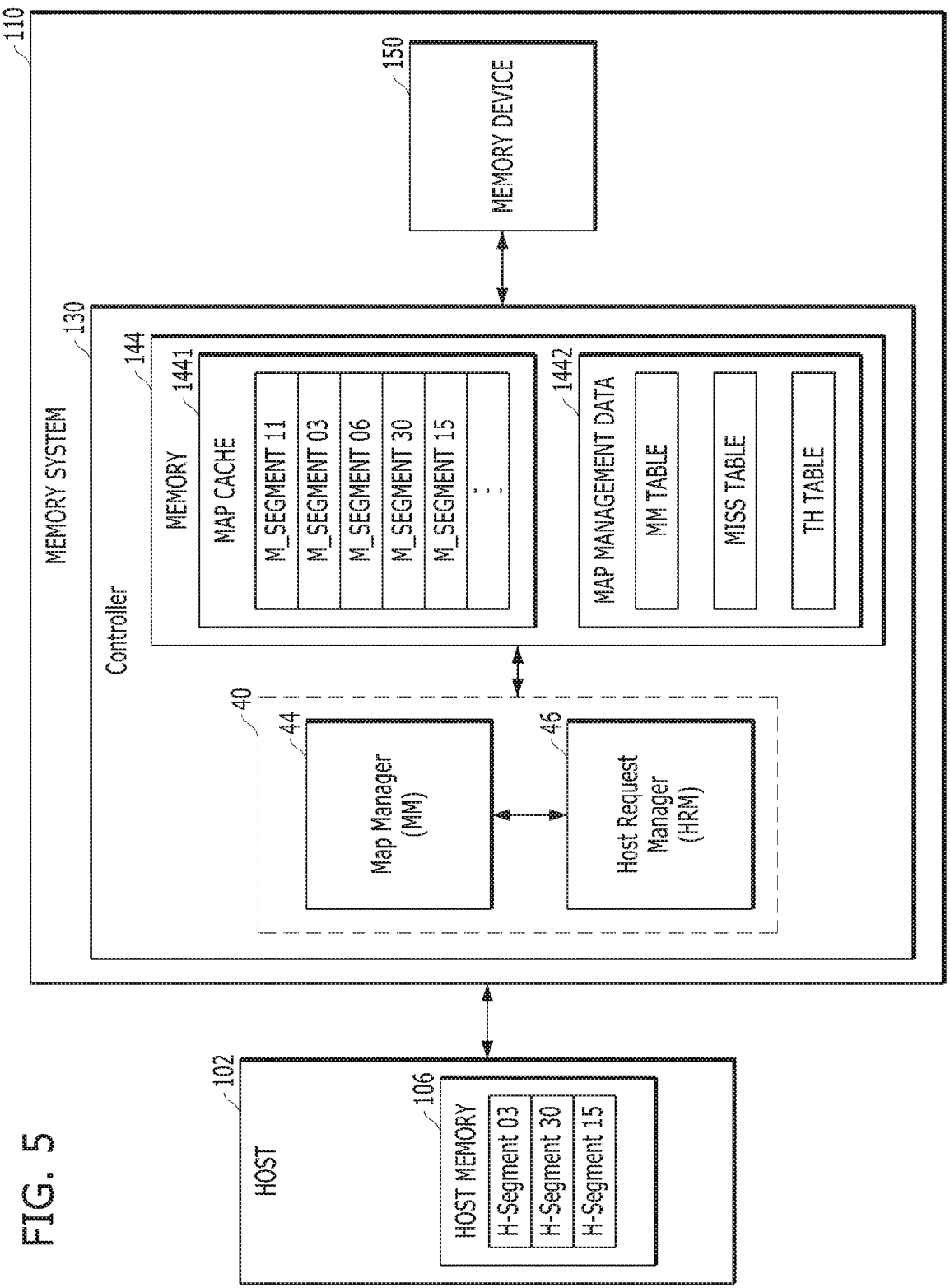

FIGS. 5 and 6 are diagrams illustrating an operation of a data processing system in accordance with an embodiment.

Before the operation of FIGS. 5 and 6 is described, the data processing system 100 may include the host 102 and the memory system 110. The host 102 and the memory system 110 may be interconnected to each other. The host 102 may be considered as a computing device, and implemented in the form of a mobile device, a computer, or a server. The memory system 110 may receive a command from the host 102, and store or output data in response to the received command.

The memory system 110 may include the memory device 150 including a storage space having nonvolatile memory cells and the controller 130 for controlling the memory device. For example, the memory system 110 may be implemented in the form of a flash memory, or a solid state drive (SSD).

In order to store data requested by the host 102 in the storage space including the nonvolatile memory cells, the memory system 110 may perform mapping between a file system used by the host 102 and the storage space including the nonvolatile memory cells. For example, an address based on the file system used by the host 102 may be referred to as a logical address, and an address in the memory device 150 including the nonvolatile memory cells may be referred to as a physical address.

For example, the controller 130 may store a plurality of map data L2P in the memory 144 and a plurality of memory blocks of the memory device 150. The plurality of map data L2P may be used to indicate a mapping relationship between a logical address and a physical address. In an embodiment, one logical address may be associated with one physical address (or physical location), or associated with a plurality of physical addresses (or physical locations). The map data L2P may be associated with one or more physical addresses corresponding to one logical address. The plurality of map data L2P may constitute one map segment.

The map segment may be considered as the unit of map information transferred between the controller 130 and the memory device 150. For example, when the controller 130 requires a physical address corresponding to a specific logical address, the controller 130 may request map data L2P for the corresponding logical address from the memory device 150. In this case, the controller 130 may not request one map data L2P, but may request a map segment as a plurality of map data L2P for a preset range of logical addresses including the corresponding logical address. Further, the memory device 150 may transmit the corresponding map segment to the controller 130. When specific map data L2P is updated, the controller 130 may update the map data L2P in the map segment loaded to the memory 144, and then program the updated map segment to the memory device 150 at a specific time point.

In an embodiment, the size of the map segment may differ depending on a method for deciding a physical address within the memory system 110, a method for programming data within the memory system 110, the size of blocks within the memory system 110, and the size of each page.

When the host 102 provides a logical address with a read request to the controller 130, the controller 130 may retrieve a physical address corresponding to the logical address based on one or more map segments stored therein, and then output data stored at the retrieved physical address to the host 102.

If the physical address retrieving operation performed by the controller 130 can be performed by the host 102, the time required for the controller 130 to output data corresponding to the read request provided by the host 102 may be shortened. The host 102 may store map data or directly access map data in order to retrieve a physical address and to provide the retrieved physical address to the controller 130.

Referring to FIG. 5, the controller 130 may include a map manager (MM) 44, a host request manager (HRM) 46 and the memory 144. The controller 130 may provide a memory map segment M_SEGMENT, which is selected from among a plurality of memory map segments by the MM 44, to the host 102.

The HRM 46 may increase a total read count ALL_RD_CNT whenever receiving a read request related to each of the memory map segments from the host 102. The HRM 46 updates the total read count ALL_RD_CNT of a map miss information table MISS TABLE in map management data 1442 through the MM 44. The total read count ALL_RD_CNT may indicate the number of read commands transferred from an external device (for example, host) during a preset operation interval. The preset operation interval may correspond to an interval for calculating the map miss ratio MISS_RATIO, and may correspond to an interval for deciding map data or a map segment which is transferred to the host 102.

In order to selectively provide one or more memory map segments to the host 102, the MM 44 may manage a plurality of memory map segments using map management data 1442. A reason why the MM 44 manages the plurality of memory map segments through the map management data 1442 is that it may be difficult for the host 102 to allocate the entire storage space within the host memory 106 in order to store the entire map data managed by the memory system 110. The storage capacity of the host memory 106 included in or used by the host 102 is greater than the storage capacity of the memory 144 used by the controller 130, but a region allocated for the memory system 110 within the host memory 106 may be limited. Therefore, the memory system 110 sorts a memory map segment including a logical address which is accessed by the host 102 at a high frequency. When the memory map segment is unconditionally provided to the host 102 because the access frequency by the host 102 is high, an upload process is continuously added. Thus, the performance may be degraded. Therefore, the map management data 1442 may be used to determine whether to upload the memory map segment, in consideration of the map miss ratio.

Referring to FIG. 6, the map management data 1442 may include a map management table MM TABLE, a map miss information table MISS TABLE and a threshold information table TH TABLE.

The map management table MM TABLE may include a field for identifier information (i.e., M_SEGMENT LIST) indicating memory map segments in response to respective indexes, a field for a read count RD_CNT corresponding to each of the memory map segments M_SEGMENT loaded to the memory 144, and a field for a candidate flag CND_FLAG.

The read count RD_CNT may indicate a value obtained by counting read commands for logical addresses in the memory map segment. That is, the MM 44 may increase the read count of the memory map segment based on a logical address in a read request of the host 102, received through the host I/F 132. The read count RD_CNT may be distinguished from the read count for each of the memory blocks within the memory device 150, which is increased when a read operation is performed on the memory block, and indicates the operation state of the memory block.

The candidate flag CND_FLAG indicates information for representing a memory map segment sorted through the read count RD_CNT in order to upload the memory map segment to the host 102. In the embodiment, the candidate flag CND_FLAG may be expressed as one-bit data, i.e. a value of 0 or 1. For example, the candidate flag CND_FLAG is changed from '0' to '1' or from '1' to '0'. In the embodiment, when the candidate flag is '1', it may indicate that the corresponding memory map segment is a memory map segment to be uploaded to the host 102.

The map miss information table MISS TABLE may include a field for the total read count ALL_RD_CNT, a field for the map miss count MISS_CNT and a field for the map miss ratio (%) MISS_CNT_RATIO.

The total read count ALL_RD_CNT may indicate the total read count obtained by counting read requests related to the respective memory map segments received from the host 102. The total read count ALL_RD_CNT may be increased by the HRM 46 whenever a read request is received from the host 102.

The map miss count MISS_CNT may be counted when the MM 44 cannot find mapping information corresponding to a logical address LBA received from the host 102 from the map cache 1441.

The map miss ratio MISS_RATIO is a percentage calculated by the MM 44 using the total read count ALL_RD_CNT and the map miss count MISS_CNT. That is, the map miss ratio MISS_RATIO is a percentage calculated to indicate the ratio of the map miss count MISS_CNT to the total read count ALL_RD_CNT.

The threshold information table TH TABLE may include a first threshold and a second threshold. The first threshold for the read count (i.e., RD_CNT TH (TH1)) may serve as a reference value for sorting a memory map segment to be transferred to the host 102. The second threshold for the map miss ratio (i.e., MISS_CNT TH (TH2)) may serve as a reference value for deciding whether to upload the sorted memory map segment.

Referring back to FIG. 5, the MM 44 may prepare one or more memory map segments M_SEGMENT accessed by the host 102 at high frequency, in order to improve the read performance of the memory system 110. That is, the MM 44 may calculate a read count RD_CNT for each of the memory map segments M_SEGMENT based on a logical address associated with the read request from the host 102. The MM 44 may prepare the memory map segment M_SEGMENT by comparing the read count RD_CNT to the first threshold TH1 in each random period.

For example, as shown in FIG. 6, when the first threshold TH1 is 500, the MM 44 checks whether the read count RD_CNT of a memory map segment 11 corresponding to an index 1 is greater than or equal to the first threshold TH1. Since the check result indicates that the read count RD_CNT of the memory map segment 11 is 30, the memory map segment 11 cannot be selected as a memory map segment to be uploaded to the host 102.

On the other hand, when the first threshold TH1 is 500, the MM 44 checks whether the read count RD_CNT of a memory map segment 03 corresponding to an index 2 is greater than or equal to the first threshold TH1. Since the check result indicates that the read count RD_CNT of the memory map segment 03 is 2000, the memory map segment 03 may be selected as a memory map segment to be uploaded to the host 102. Therefore, the candidate flag value is changed from 0 to 1.

Through such an operation, the MM 44 sorts a memory map segment 13, a memory map segment 30 and a memory map segment 15 into memory map segments to be uploaded to the host 102, in order to prepare the memory map segments.

When determining that there is a memory map segment M_SEGMENT to be uploaded to the host 102 after an operation for the read request is completed, the MM 44 checks whether the map miss ratio (%) MISS_RATIO is greater than or equal to the second threshold TH2. When the map miss ratio MISS_RATIO is greater than or equal to the second threshold TH2, the MM 44 may provide the sorted memory map segments M_SEGMENT to the host 102. The reason to decide whether to upload the memory map segments through the map miss ratio (%) MISS_RATIO is that, when the memory map segments are unconditionally provided to the host 102 because the access frequency by the host 102 is high, the upload process is continuously added to degrade the performance. For example, when the second threshold is 25% and the current map miss ratio (%) is 30%, the map hit ratio is low because the current map miss ratio (%) is greater than or equal to the second threshold TH2. Therefore, the MM 44 may transfer the one or more memory map segments M_SEGMENT to the host 102.

Figure 7:
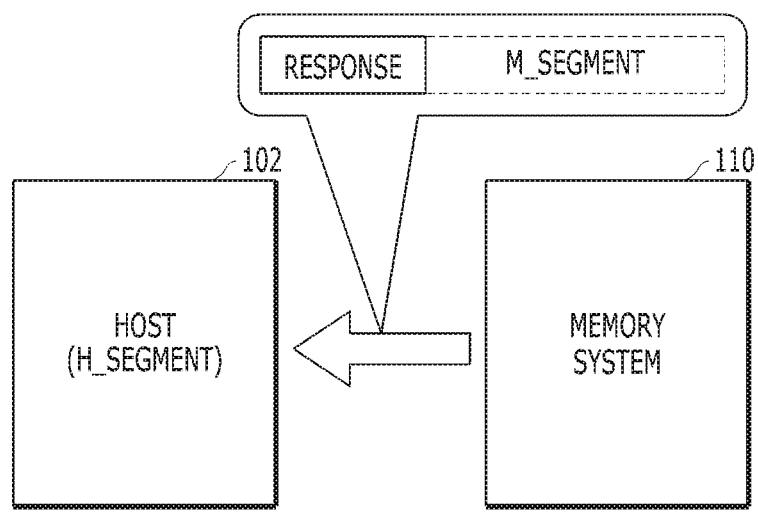
FIG. 7 is a diagram illustrating a transaction between a host and a memory system in a data processing system in accordance with the present embodiment.

When a notice that the MM 44 will transfer the memory map segment M_SEGMENT to the host 102 is not sent in advance even though the MM 44 intends to transmit the memory map segment M_SEGMENT, the MM 44 may add the notice to a response RESPONSE and transfer the response RESPONSE to the host 102, as shown in FIG. 7.

When the notice that the MM 44 will transfer the map data has been already sent, the MM 44 may add the memory map segment M_SEGMENT to the response RESPONSE. The MM 44 may transmit the response RESPONSE including the memory map segment M_SEGMENT.

Then, the MM 44 not only resets the total read count ALL_RD_CNT and the map miss count MISS_CNT, but also resets the candidate flag CND_FLAG indicating a candidate memory map segment M_SEGMENT to be uploaded to the host 102.

On the other hand, when the map miss ratio (%) MISS_RATIO is less than the second threshold TH2, the MM 44 may transmit a response RESPONSE including information on whether an operation corresponding to a command from the host 102 has been completed (i.e., success or fail).

The host 102 may include the host processor 104, the host memory 106 and the host controller interface 108. The host processor 104 may receive one or more of a response RESPONSE from the memory system 110 through the host controller interface 108, a response with a notice RESPONSE WITH NOTICE and a response with map data RESPONSE WITH MAP INFO. The host processor 104 may check whether the notice is included in the received response. When the notice is included in the received response, the host 102 may prepare to receive and store a memory map segment M_SEGMENT which may be transferred later. Then, the host processor 104 may check a response corresponding to a previous command. For example, the host processor 104 may check the response to determine whether the previous command succeeded or failed. When no notice is included in the received response, the host processor 104 may check whether the memory map segment M_SEGMENT is included in the response. When the memory map segment M_SEGMENT is not included in the received response, the host processor 104 may check the response corresponding to the previous command. When the memory map segment M_SEGMENT is included in the received response, the host processor 104 may store the memory map segment M_SEGMENT in the response as a host map segment H_SEGMENT in the host memory 106, or update the host map segment H_SEGMENT which is already stored in the host memory 106. The host processor 104 may check the response corresponding to the previous command. For example, the host processor 104 may check the response to determine whether the previous command succeeded or failed.

FIG. 7 is a diagram illustrating a transaction between the host 102 and the memory system 110 in the data processing system in accordance with the present embodiment.

Referring to FIG. 7, the memory system 110 may transfer a memory map segment M_SEGMENT to the host 102. The memory system 110 may transfer the memory map segment M_SEGMENT using a response RESPONSE to the host 102.

The response for transferring map data may not be specifically limited. For example, the memory system 110 may transfer the memory map segment M_SEGMENT to the host 102, using a response corresponding to a read request, a response corresponding to a write command, or a response corresponding to an erase command.

The memory system 110 and the host 102 may exchange requests and responses based on a unit format which is set according to a preset protocol. For example, the response RESPONSE may include a header, information indicating a success or fail on a request provided by the host 102, and additional information indicating the state of the memory system 110. The memory system 110 may include map data in the response RESPONSE and transfer the response RESPONSE to the host 102. This configuration will be described in detail with reference to FIGS. 8 and 9.

Figure 8:
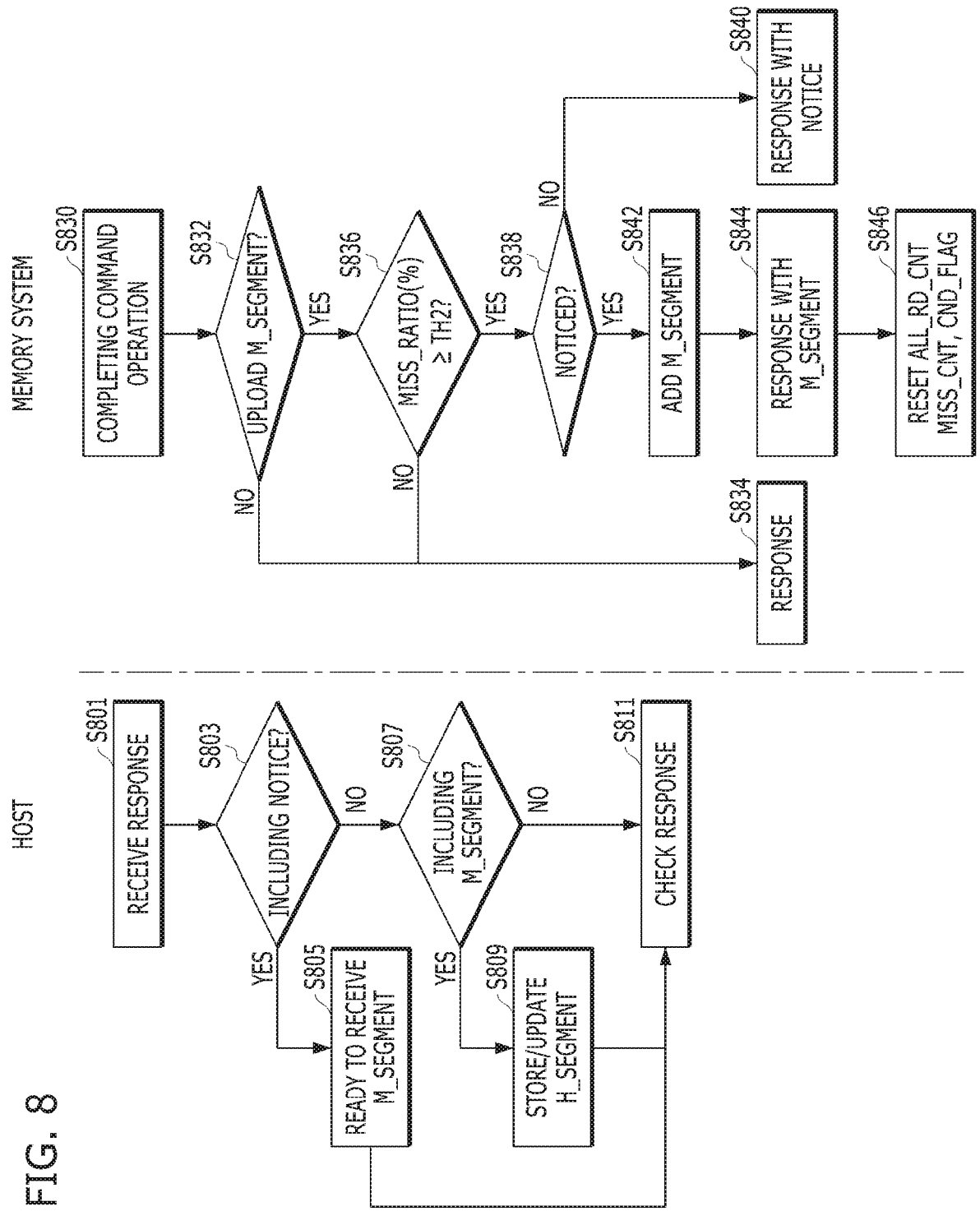
FIG. 8 is a flowchart illustrating an operation of a host and a memory system in accordance with an embodiment.

FIG. 8 is a flowchart illustrating an operation of the host and the memory system in accordance with an embodiment. Steps S830 to S846 illustrate the case in which the memory system 110 provides a memory map segment M_SEGMENT after completing an operation corresponding to a request from the host 102. Steps S801 to S811 illustrate the case in which the host 102 stores a memory map segment M_SEGMENT received with a response from the memory system 110.

Referring to FIG. 8, the controller 130 may check whether an operation corresponding to a command from the host 102 is completed, in step S830. After the operation corresponding to the command is completed, the controller 130 may check whether there is a memory map segment M_SEGMENT to be transmitted to the host 102, before transmitting the response RESPONSE corresponding to the command, in step S832. The method for sorting memory map segments M_SEGMENT to be provided to the host 102 will be described with reference to FIG. 9.

When there is no memory map segment M_SEGMENT to be provided to the host 102 ("NO" in step S832), the controller 130 may transmit a response RESPONSE including information on whether the operation corresponding to the command from the host 102 has been completed (i.e., success or fail), in step S834.

When there is a memory map segment M_SEGMENT to be provided to the host 102 ("YES" in step S832), the MM 44 checks whether the map miss ratio (%) MISS_RATIO is greater than or equal to the second threshold TH2, in step S836.

When the map miss ratio (%) MISS_RATIO is less than the second threshold TH2 ("NO" in step S836), the controller 130 may transmit the response RESPONSE including the information on whether the operation corresponding to the command transmitted from the host 102 has been completed (i.e., success or fail), in step S834.

On the other hand, when the map miss ratio (%) MISS_RATIO is greater than or equal to the second threshold ("YES" in step S836), the controller 130 may check whether a notice NOTICE that the controller 130 will transmit the memory map segment M_SEGMENT to the host 102 was sent, in step S838. The notice NOTICE may be similar to that described with reference to FIG. 7. For example, when the second threshold TH2 of the map miss ratio (%) MISS_RATIO is 25% and the current map miss ratio (%) MISS_RATIO is 30%, the map hit ratio is low because the current map miss ratio (%) MISS_RATIO is greater than or equal to the second threshold TH2. Therefore, the controller 130 may transfer one or more memory map segments M_SEGMENT to the host 102.

When the notice that the controller 130 will transmit the memory map segment M_SEGMENT to the host 102 was not sent in advance ("NO" in step S838) even though the controller 130 intends to transmit the memory map segment M_SEGMENT, the controller 130 may add the notice NOTICE to the response RESPONSE and transfer the response to the host 102, in step S840.

When the notice that the controller 130 will transmit the memory map segment M_SEGMENT to the host 102 has been already sent ("YES" in step S838), the controller 130 may add the memory map segment M_SEGMENT to the response in step S842. In step S844, the controller 130 may transmit the response including the memory map segment M_SEGMENT.

Then, in step S846, the controller 130 not only resets the total read count ALL_RD_CNT and the map miss count MISS_CNT, but also resets the candidate flag CND_FLAG indicating a candidate memory map segment M_SEGMENT to be uploaded to the host 102.

In step S801, the host processor 104 of the host 102 may receive one or more of the response RESPONSE from the memory system 110, a response with a notice RESPONSE WITH NOTICE, and a response with map data RESPOSNE WITH MAP INFO.

In step S803, the host processor 104 may check whether the notice is included in the received response. If the notice is included in the received response ("YES" in step S803), the host 102 may prepare to receive and store a memory map segment M_SEGMENT which may be transmitted later, in step S805.

In step S811, the host processor 104 may check a response corresponding to a previous command. For example, the host processor 140 may check the response to check whether the previous command is a success or fail.

When the notice is not included in the received response ("NO" in step S803), the host processor 104 may check whether the memory map segment M_SEGMENT is included in the response, in step S807.

When the memory map segment M_SEGMENT is not included in the received response ("NO" in step S807), the host processor 104 may check the response corresponding to the previous command in step S811.

When the memory map segment M_SEGMENT is included in the received response ("YES" in step S803), the host processor 104 may store the memory map segment M_SEGMENT in the response as a host map segment H_SEGMENT in the host memory 106, or update the host map segment H_SEGMENT which is already stored in the host memory 106, in step S809. For example, as shown in FIG. 5, the host 102 may store a memory map segment 03, a memory map segment 30, and a memory map segment 15, which are received from the memory system, as a host map segment 03, a host map segment 30, and a host map segment 15, respectively. When a host map segment corresponding to the memory map segment is present in the host memory, the host 102 may update the host map segment.

Then, in step S811, the host processor 104 may check the response corresponding to the previous command. For example, the host processor 140 may check the response to check whether the previous command is a success or fail.

Figure 9:
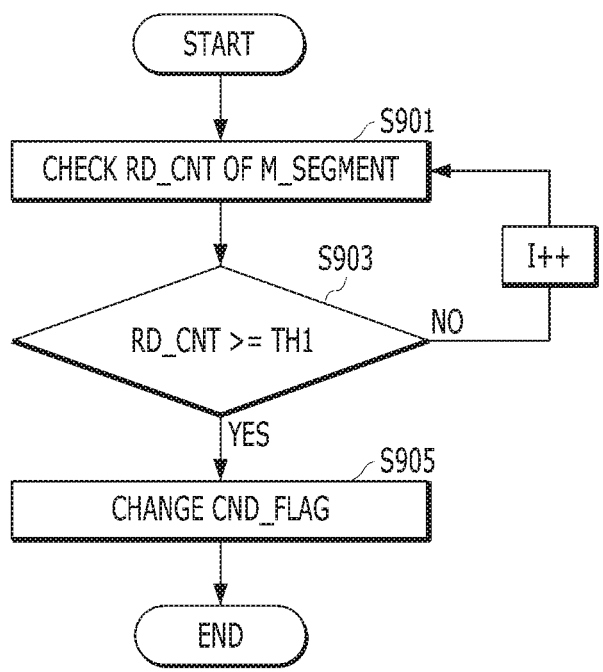
FIG. 9 is a flowchart illustrating a method for sorting candidate memory map segments in accordance with an embodiment.

FIG. 9 is a flowchart illustrating a method for sorting candidate memory map segments in accordance with an embodiment.

Referring to FIG. 9, the memory map segment M_SEGMENT to be provided to the host 102 may indicate a segment which has not been provided to the host 102 in each random period and whose read count is greater than or equal to the first threshold TH1, or a segment whose mapping information has been changed by a command operation or internal operation and whose read count is greater than or equal to the first threshold TH1.

In step S901, the controller 130 checks the read count RD_CNT corresponding to each of the memory map segments stored in the map management table MM TABLE. The read count RD_CNT may indicate information counted when the MM 44 receives a read request for logical addresses included in each of the memory map segments from the host 102.

In step S903, the MM 44 sequentially checks whether the read counts RD_CNT of the respective memory map segments are greater than or equal to the first threshold TH1. That is, the MM 44 checks whether the read count of a memory map segment corresponding to an index 1 is greater than or equal to the first threshold TH1.

When the check result indicates that the read count RD_CNT of the memory map segment corresponding to the index 1 is less than the first threshold TH1 ("NO" in step S903), the MM 44 increases the index information of the memory map segment by '1' (I++), and performs step S901 again. For example, when the first threshold TH1 is 500, the MM 44 checks whether the read count RD_CNT of the memory map segment 11 corresponding to the index 1 is greater than or equal to the first threshold TH1. Since the check result indicates that the read count RD_CNT of the memory map segment 11 is 30, the memory map segment cannot be selected as a memory map segment to be uploaded to the host 102.

On the other hand, when the read count RD_CNT of the memory map segment corresponding to the index 1 is greater than or equal to the first threshold TH1 ("YES" in step S903), the MM 44 may change a candidate flag corresponding to the memory map segment in step S905. For example, the candidate flag may be expressed as 1-bit data, and changed from '0' to '1' or from '1' to '0'. In the embodiment, when the candidate flag is '1', it may indicate that the corresponding memory map segment is a memory map segment to be uploaded to the host 102. For example, when the first threshold TH1 is 500, the MM 44 checks whether the read count RD_CNT of the memory map segment 03 corresponding to the index 2 is greater than or equal to the first threshold TH1. Since the check result indicates that the read count RD_CNT of the memory map segment 03 is 2000, the memory map segment 03 may be selected as a memory map segment to be uploaded to the host 102.

Figure 10:
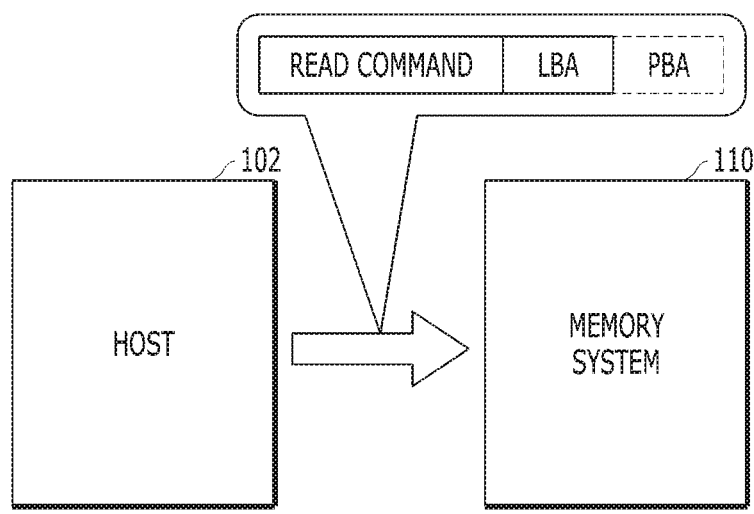
FIG. 10 is a diagram illustrating an operation between a host and a memory system in a data processing system in accordance with the present embodiment.

FIG. 10 is a diagram illustrating an operation between the host 102 and the memory system 110 in the data processing system in accordance with the present embodiment.

Referring to FIG. 10, the host 102 having map data stored therein may transfer a read command READ COMMAND with a logical address LBA and a physical address PBA to the memory system 110. When the physical address PBA corresponding to the logical address LBA associated with the read command READ COMMAND is present in the map data stored in the host 102, the host 102 may transmit the read command READ COMMAND with the logical address LBA and the physical address PBA to the memory system 110. However, when the physical address PBA corresponding to the logical address LBA associated with the read command READ COMMAND is not present in the map data stored in the host 102, the host 102 may transmit the read command READ COMMAND with only the logical address LBA, i.e., the read command READ COMMAND without the physical address PBA to the memory system 110.

In FIG. 10, the read command READ COMMAND has been taken as an example for description. In an embodiment, however, a write command or erase command which the host 102 can transmit to the memory system 110 may be applied.

Figure 11:
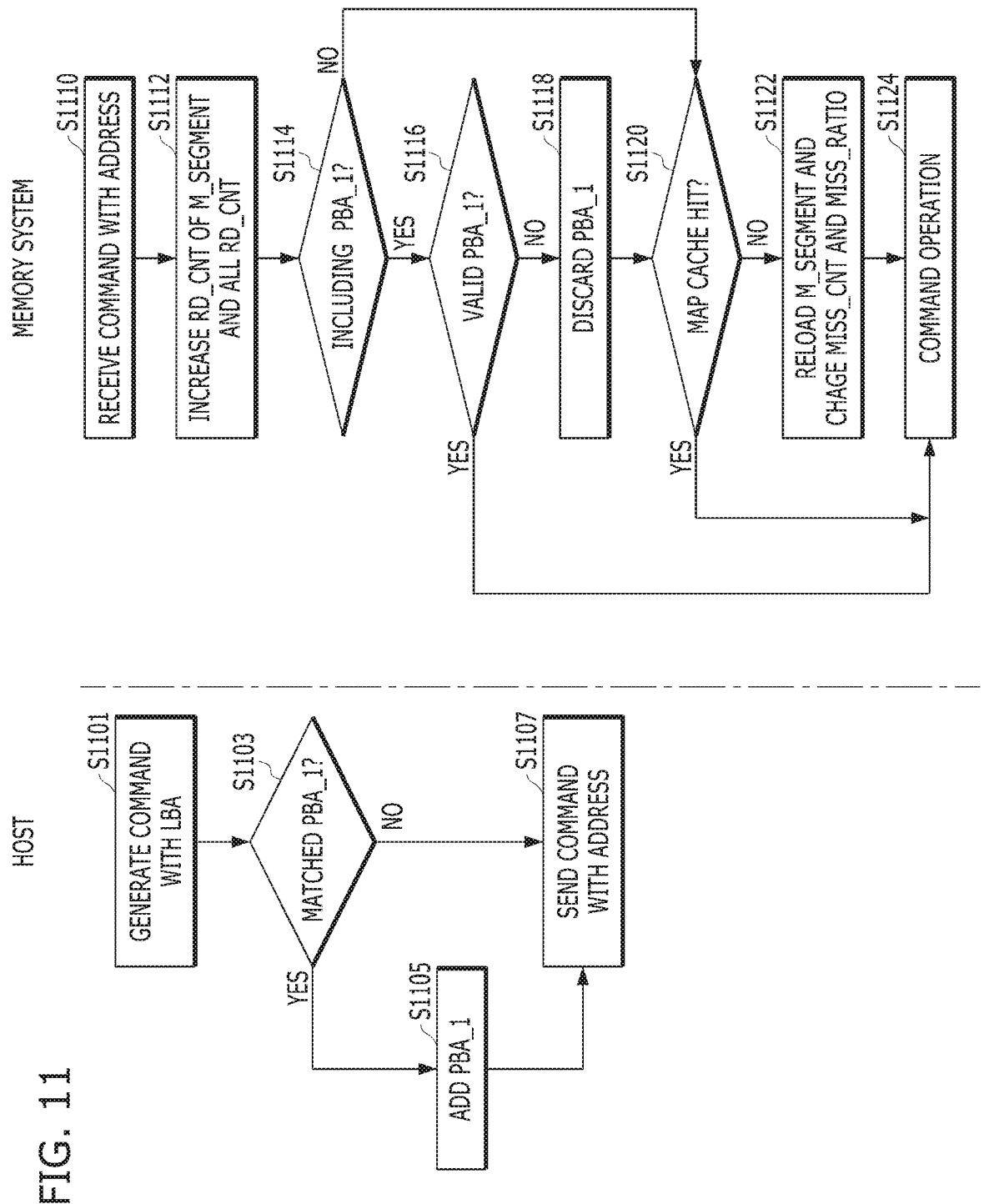
FIG. 11 is a flowchart illustrating operations of a host and a memory system in accordance with the present embodiment.

FIG. 11 is a flowchart illustrating operations of the host and the memory system in accordance with the present embodiment.

Steps S1101 to S1107 illustrate an operation of the host 102 which provides the memory system 110 with a request REQUEST including a command, and logical and physical addresses LBA/PBA. Steps S1116 to 1124 illustrate a specific operation of the memory system 110 which receives the request.

Referring to FIG. 11, the host processor 104 may generate a command and a logical address LBA in step S1101.

In step S1103, the host processor 104 may determine whether a physical address PBA_1 corresponding to the logical address LBA is included in a host map segment cached in the host memory 106.

When there is no physical address corresponding to the logical address LBA ("NO" in step S1103), the host processor 104 may provide a request including the command and the logical address LBA to the memory system 110 in step S1107.

When there is a physical address corresponding to the logical address ("YES" in step S1103), the host processor 104 may add the physical address PBA_1 to the command and the logical address LBA in step S1105. In step S1107, the host processor 104 may send the command with the logical/physical addresses LBA/PBA to the memory system 110. That is, when there is the physical address corresponding to the logical address LBA based on the memory map segment M_SEGMENT received from the memory system 110, the host processor 104 may provide a request including the command and the physical address PBA_1 to the memory system 110.

In step S1110, the controller 130 may receive the request from the outside through the host I/F 132. The request received from the outside may include the command and the logical address LBA or the logical/physical addresses LBA/PBA_1.

In step S1112, the controller 130 may increase the total read count ALL_RD_CNT and the read count RD_CNT of the memory map segment M_SEGMENT including the logical address LBA.

In step S1114, the controller 130 may determine whether the physical address PBA_1 is included in the received request.

When the physical address PBA_1 is not included in the received request ("NO" in step S1114), the controller 130 may retrieve the physical address PBA_1 corresponding to the logical address included in the received request in step S1120.

When the physical address PBA_1 is included in the received request ("YES" in step S1114), the controller 130 may determine whether the physical address PBA_1 is valid, in step S1116.

A reason why the controller 130 checks whether the physical address PBA_1 is valid is that the memory map segment M_SEGMENT managed by the memory system 110 may be changed and updated after the memory system 110 provides the memory map segment M_SEGMENT to the host 102. Therefore, when the host map segment H_SEGMENT is not matched with the memory map segment M_SEGMENT, the physical address PBA_1 received from the host 102 cannot be used. Therefore, the MM 44 may determine whether the physical address PBA_1 in the received request REQUEST is valid.

For example, when the memory map segment M_SEGMENT is changed after being provided to the host 102, the controller 130 may store time stamp information (not illustrated) in the memory 144, to indicate that the corresponding memory map segment M_SEGMENT was changed. The time stamp information may include first time information indicating that the memory map segment M_SEGMENT has been recently changed and second time information changed before the first time information, or may include time information indicating that the memory map segment M_SEGMENT has been recently changed. The MM 44 may determine the time sequence using the time stamp information, and thus determine whether the physical address is valid. When receiving the logical address LBA and the physical address PBA_1 from the host 102, the MM 44 may determine whether the memory map segment M_SEGMENT including the logical address LBA was changed, and thus determine whether the physical address PBA_1 is valid. The method for determining whether the physical address PBA_1 received from the host 102 is valid may be implemented differently depending on the configuration of the memory system 110.

When the physical address PBA_1 in the received request is valid ("YES" in step S1116), the controller 130 may perform an operation corresponding to the request using the physical address PBA_1 in step S1124.

When the physical address PBA_1 in the received request is not valid ("NO" in step S1116), the controller 130 may discard the physical address PBA_1 in step S1118.

In step S1120, the controller 130 may retrieve a physical address PBA_2 corresponding to the logical address LBA from the map cache 1441, based on the logical address LBA in the received request.

When the memory map segment M_SEGMENT including the logical address LBA in the received request is present in the map cache 1441 (i.e., map cache hit) ("YES" in step S1120), the MM 44 may perform an operation corresponding to the request of the host 102 using the physical address PBA_2 in step S1124. That is, when the physical address PBA_1 corresponding to the logical address LBA can be used because the memory map segment M_SEGMENT including the logical address LBA is present in the map cache 1441, the controller 130 may determine that a map hit MAP HIT occurred.

When the memory map segment including the logical address LBA in the received request is not present in the map cache 1441 (i.e., map cache miss) ("NO" in step S1120), the controller 130 may reload the memory map segment M_SEGMENT including the logical address LBA from the memory device 150, and change the map miss ratio (%) MISS_RATIO, in step S1122. That is, when the memory map segment M_SEGMENT is reloaded from the memory device 150, the MM 44 may determine that a map miss MAP MISS occurred. Therefore, the controller 130 may increase the map miss count MISS_CNT. Furthermore, the controller 130 may change the map miss ratio (%) MISS_RATIO according to the map miss count MISS_CNT and the read count RD_CNT. That is, the map miss ratio (%) MISS_RATIO may be decreased when the read count RD_CNT is increased, and increased when the map miss count is increased as a map miss occurs whenever the read command is inputted. In an embodiment, the MM 44 may reset the map miss ratio (%) in a predetermined period.

In step S1124, the controller 130 may perform an operation corresponding to the request using a physical address PBA_3 corresponding to the logical address LBA in the memory map segment M_SEGMENT reloaded from the memory device 150.

In accordance with the embodiments, the data processing system and the operating method thereof may use the map miss ratio to manage map data which are shared by the host or computing device, and the memory system within the data processing system, thereby reducing an overhead which may occur in the data processing system and improving the operation efficiency of the memory system.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
    a non-volatile memory device; and
    a controller including a memory, suitable for generating map data for mapping between a physical address corresponding to data within the non-volatile memory device in response to a command and a logical address used by and input from a host which is an external device coupled to the memory system,
    wherein the controller selects one or more memory map segments, including the map data, based on each read count associated with each of the memory map segments among a plurality of memory map segments, calculates a map miss ratio of the memory based on a total read count and a map miss count, and transmits the selected one or more memory map segments to the host based on the map miss ratio.

2. The memory system of claim 1, wherein the controller increases the read count of the memory map segment corresponding to the logical address in the read request received from the host.

3. The memory system of claim 1, wherein the map miss count indicates information counted when the controller cannot find a physical address corresponding to the logical address from a map cache.

4. The memory system of claim 1, wherein the total read count indicates total read count information counted whenever the controller receives a read command from the host.

5. The memory system of claim 1, wherein the map miss ratio is calculated by the controller using the total read count and the map miss count, and is changed whenever the total read count and the map miss count are increased.

6. The memory system of claim 1, wherein the controller is configured to:
    perform an operation corresponding to a command inputted from the host;
    insert the at least some of the map information into a response regarding the command; and
    transfer the response including the inserted at least some of the map information to the host.

7. The memory system according to claim 1, wherein the controller is configured to:
    determine that a command inputted from the host includes a logical address and a physical address;
    determine whether the physical address inputted with the command is valid;
    determine whether the physical address is used based on the validity of the physical address; and
    perform an operation corresponding to the command using the physical address.

8. The memory system of claim 7, wherein, when the first physical address is not valid, the controller discards the first physical address and retrieves a second physical address corresponding to the logical address from a map cache.

9. The memory system of claim 8, wherein, when the second physical address corresponding to the logical address is not present in the map cache, the controller reloads a memory map segment including a third physical address corresponding to the logical address, performs an operation corresponding to the command, and increases the map miss count.

10. The memory system of claim 1, wherein, whenever a read command associated with each of the memory map segments is received, the controller increases the read count corresponding to the memory map segment and the total read count.

11. The memory system of claim 1, wherein the controller selects one or more memory map segments corresponding to read counts greater than or equal to the first threshold, among the plurality of memory map segments, and changes candidate flag information indicating a memory map segment to be uploaded to the host.

12. The memory system of claim 1, wherein the controller transfers the selected memory map segment to the host, and then resets a candidate flag, the total read count, the map miss count, and the map miss ratio.

13. An operating method of a memory system which includes a non-volatile memory device and a controller including a memory, the memory system coupled to a host which is an external device coupled to the memory system, the operating method comprising:
    changing a read count of a map segment corresponding to a logical address used by and input from the host, among a plurality of memory map segments;
    selecting one or more memory map segments having read counts equal to or greater than a first threshold among a plurality of memory map segments;
    deciding whether to upload the selected memory map segments to the host, when a map miss ratio of the memory is greater than or equal to a second threshold; and
    transferring the selected memory map segments to the host in response to the decision result.

14. The operating method of claim 13, further comprising:
    performing an operation corresponding to a command inputted from the host;
    inserting the at least some of the map information into a response regarding the command; and
    transferring the response including the inserted at least some of the map information to the host.

15. The operating method of claim 13, further comprising:
    determining that a command inputted from the host includes a logical address and a physical address;
    determining whether the physical address inputted with the command is valid;
    determining whether the physical address is used based on the validity of the physical address; and
    performing an operation corresponding to the command using the physical address.

16. The operating method of claim 15, further comprising:
    discarding, by the controller, the first physical address when the first physical address is not valid; and
    retrieving a second physical address corresponding to the logical address from a map cache.

17. The operating method of claim 16, further comprising:
reloading a memory map segment including a third physical address corresponding to the logical address from the non-volatile memory device, when the second physical address corresponding to the logical address is not present in the map cache; and
increasing the map miss ratio using a map miss count and a total read count, and performing an operation corresponding to the command.

18. The operating method of claim 13, further comprising increasing the read count corresponding to the memory map segment and a total read count, whenever a read command associated with each of the memory map segments is received.

19. The operating method of claim 13, wherein the selecting of some of the plurality of memory map segments comprises:
checking the read count corresponding to each of the memory map segments;
selecting at least one memory map segment among the plurality of memory map segments, when the read count corresponding to the selected memory map segment is greater than or equal to the first threshold; and
changing candidate flag information indicating the selected memory map segment.

20. The operating method of claim 13, wherein the controller increases the read count of the memory map segment corresponding to the logical address in the read request received from the host.

21. The operating method of claim 17, wherein the map miss count indicates information counted when the controller cannot find a physical address corresponding to the logical address from the map cache.

22. The operating method of claim 17, wherein the total read count indicates total read counts counted whenever the controller receives a read command from the host.

23. The operating method of claim 13, wherein the map miss ratio is calculated by the controller using the total read count and the map miss count, and is changed whenever the total read count and the map miss count are increased.

24. The operating method of claim 13, further comprising resetting a candidate flag, a total read count, the map miss count and the map miss ratio after transferring the memory map segment to the host.

25. A memory system comprising:
a non-volatile memory device; and
a controller including a map cache for storing a plurality of map segments associated with the non-volatile memory device, suitable for:
receiving read commands along with a logical address used by and input from a host which is an external device coupled to the memory system;
determining map miss counts of the map cache for the plurality of map segments corresponding to the read commands;
selecting at least one map segment among the plurality of map segments, when a map miss count corresponding to the selected map segment is greater than or equal to a threshold value; and
transmitting the selected map segment to the host.

* * * * *